United States Patent [19]
Schneider

[11] 4,110,984
[45] Sep. 5, 1978

[54] ROTARY PISTON ENGINE USING ELECTRIC HEATING TO FLASH MOTIVE FLUID

[76] Inventor: Rolf Schneider, im Sellhof 560, 8215 Hallau, Switzerland

[21] Appl. No.: 777,854

[22] Filed: Mar. 15, 1977

[30] Foreign Application Priority Data

Jun. 22, 1976 [CH] Switzerland ............. 007984/76

[51] Int. Cl.² .................. F01C 21/12; F01K 25/06; F01K 25/12
[52] U.S. Cl. ................................ 60/509; 60/513; 418/61 A
[58] Field of Search ............. 418/61 A; 60/508, 509, 60/511, 513, 514

[56] References Cited

U.S. PATENT DOCUMENTS

| | | | |
|---|---|---|---|
| 1,530,307 | 3/1925 | Dawson | 60/513 |
| 3,280,812 | 10/1966 | Peras | 418/61 A |
| 3,945,211 | 3/1976 | Rowe | 60/508 |
| 3,977,191 | 8/1976 | Britt | 60/513 |
| 3,979,911 | 9/1976 | Mason | 60/513 |

FOREIGN PATENT DOCUMENTS

39,864 10/1972 Japan .................. 60/513

*Primary Examiner*—Carlton R. Croyle
*Assistant Examiner*—Thomas I. Ross
*Attorney, Agent, or Firm*—Ernest F. Marmorek

[57] ABSTRACT

A machine operable according to the gas discharge principle comprising a fixed housing having side walls and a casing surrounding peripherally the side walls, a rotary member arranged for rotation in the housing in an eccentric fashion, and having a plurality of projections, which during the rotation are in continuous sliding contact with the inner surface of the casing and slide along it, the rotary member during rotation forms a plurality of operating chambers having each a variable volume, further including an inner toothed wheel fixed on the rotary member and an outer toothed wheel fixed on the housing, a plurality of electrodes provided in the casing of the housing, an electrode provided in the rotary member, the electrodes in the casing and the electrodes in the rotary member being arranged lying opposite with respect to each other when the rotary member is mounted in the housing for rotation and the electrodes in the casing and the rotary member having a predetermined distance with respect to each other in predetermined rotary positions of the rotary member, a source of voltage and means connecting each of the electrodes of the casing and of the rotary member to the voltage source for creating an electrical field between respective electrodes in the casing and in the rotary member at a predetermined sequence, a closed circuit coupled to the housing for supplying thereto an operating medium in a predetermined quantity and at predetermined instant.

11 Claims, 13 Drawing Figures

ROTARY PISTON ENGINE USING ELECTRIC HEATING TO FLASH MOTIVE FLUID

FIELD OF THE INVENTION

The present invention relates to a machine having a rotary piston operating on the gas discharge principle and set in a fixed housing which housing is provided by a casing means surrounded by side walls and in which housing a movable part, the rotary piston, is mounted for rotation in an eccentric fashion, the movable member having a plurality of projection with which during rotation it is in a continuous sliding contact with the inner surface of the casing whereupon a plurality of operating chambers or spaces become formed which charge their volumes, and which machine includes also an internally toothed wheel secured on the movable member and an outside toothed wheel secured on the housing.

BACKGROUND OF THE INVENTION

Rotary piston machines have been known which operate as combustion machines. Such machines possess the disadvantage that they expel the burned fuel as an exhaust gas. Such machines, as a result of the exhaust gases they produce, are not favored due to environmental considerations. In stationary machines on the other hand, the exhaust gases must be conducted away over long conduits.

Furthermore, there are rotary piston machines known which are driven with the help of a gas under pressure. Such machines, however, possess the disadvantage that the gas must be stored in a separate device.

SUMMARY OF THE INVENTION

It is, therefore, an object of the present invention to provide a machine having a rotary piston which does not possess the above-noted disadvantages.

A further object therefore of the present invention is to provide a rotary piston machine operating on the gas discharge principle which produces no exhaust gases.

According to the present invention, there is provided in the casing of the housing of the machine a plurality of electrically conducting means and, in the movable member, an electrically conducting means is also provided. The arrangement is such that the conducting means above noted are placed opposite to each other when the movable member is mounted in the housing and during each rotary movement, they will assume a certain distance with respect to each other. Furthermore, the above noted means individually are connected with a voltage source so that they produce between the above noted means in the movable member and the means provided in the housing, an electrical field. Furthermore, a closed circuit is provided for the preparation of an operating medium which circuit delivers a predetermined quantity of the operating mediums into the housing.

The invention also provides a method for operating a rotary piston machine according to which the operating medium comprises a mixture from an ionizable gas and an electrically conducting substance which can be evaporated.

The invention will become more readily apparent from the following description of preferred embodiments shown, by way of example, in the accompanying drawings, in which.

DESCRIPTION OF THE PREFERRED EMBODIMENTS

Figure 1:
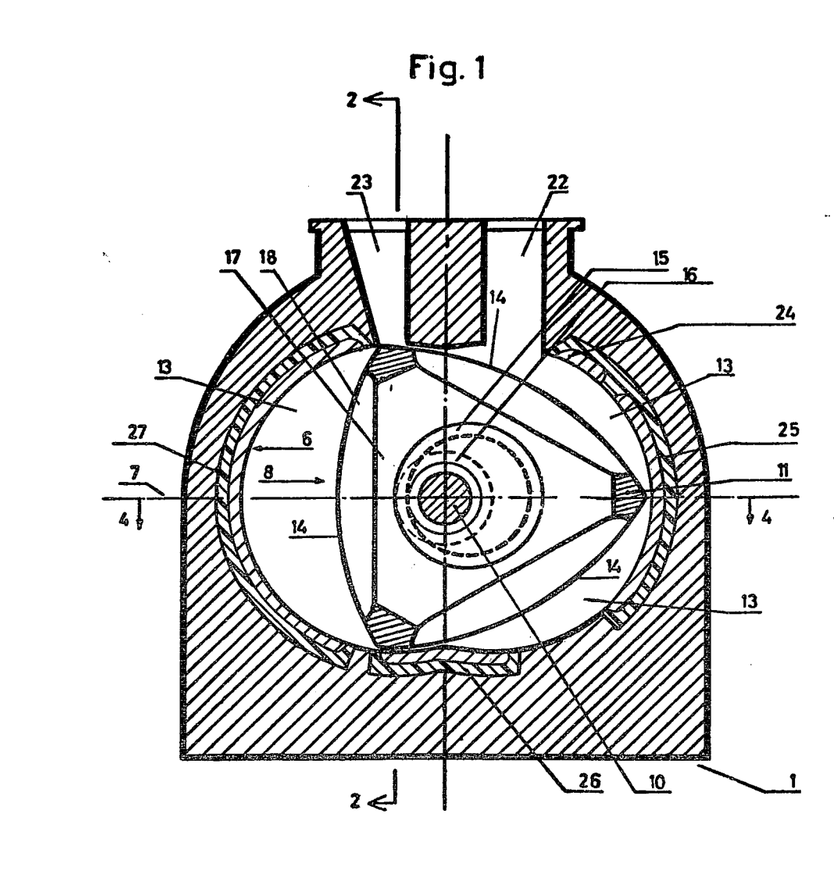
FIG. 1 illustrates a machine having a rotary piston in which the side or end plate has been removed in order to show the movable member in its position within the housing.
Figure 2:
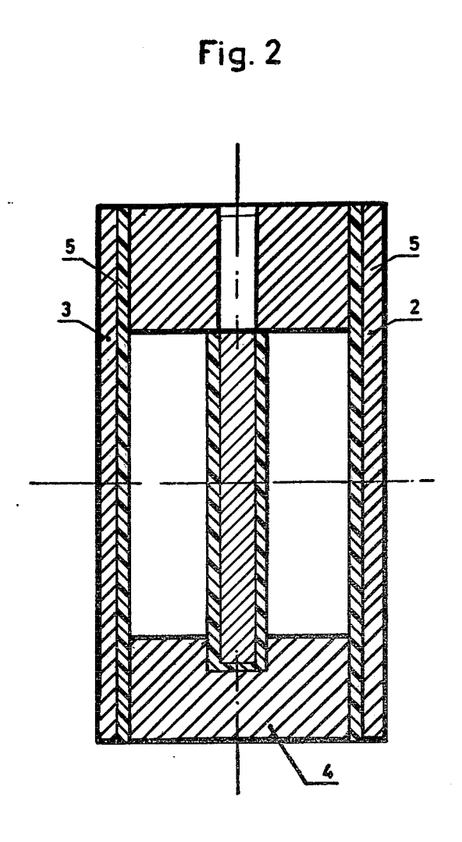
FIG. 2 is a cross sectional view taken along the line 2—2 of FIG. 1.

With reference to FIGS. 1 and 2, it is noted that the housing 1 of the machine having a rotary piston therein comprises a pair of parallel arranged side walls 2 and 3 and a peripheral casing wall 4 which connects the two side walls 2 and 3 with each other. Between the respective side walls and the circumferential wall 4 on each side, there is an insulating disc 5. The inner surface 6 and the peripheral wall 4, in their cross section, are shaped as a double arched epitrochoid and their center axis is indicated at 7. The inner chamber defined or surrounded by the side walls 2, 3, and the peripheral wall 4 contains in it a movable member 8 which is mounted therein in a rotary fashion. The movable member 8 is secured on an axle 10, the axis of rotation of which coincides with axis 7 of the housing 1 and is journalled for rotation in the side walls 2, 3. The movable member or runner 8 is provided with sealing means, not illustrated, and which are resiliently movable in the radial direction. Such sealing means slide during the relative movement of the runner 8 and the inner surface 6 of the housing 1. The relative movement will affect a drive gear which comprises a pair of inner toothed wheels 15 secured on the runner 8 and a pair of outwardly toothed wheels 16 arranged in meshing contact with the wheels 15, and which in turn are secured on the shaft 10. The translating ratio between the toothed wheels 15, 16, amounts in the illustrated embodiment to 3:2, so that the shaft 10 for each rotation of the runner 8 will perform 3 rotations about its axis in the same direction. The drive gear itself does not have to translate any rotary momentum as it serves only for the retaining of the proper phase position between the runner 8 and the housing 1.

In the housing 1, there are provided an input channel 22 for an operating medium and an output channel 23 for the displaced gas mixture. Furthermore, there are four electrically conducting portions 24, 25, 26, and 27 in the peripheral wall 4 of the housing 1, which in the above noted sequence, serve as the firing anode 24, the build-up anode 25, the sustaining anode 26, and the operating anode 27. The individual anodes are flush with the inner surface 6 of the peripheral wall 4 and are connected individually through an electrical conductor with the positive pole of a voltage source, which itself is not illustrated. The anodes 24-27 are arranged in such a manner that they lie oppositely lined-up with the cathode arranged in the runner 8 when the runner 8 is mounted in the housing 1. The firing anode 24 is directly next to the input channel 22 in the peripheral wall and extends over a portion of the inner surface of the peripheral wall 4. The build-up anode 25 is a distance away from anode 24, which distance depends from the applied voltage, and extends over the inner surface of the peripheral wall 4 in such a manner that the extension covers a good portion of one of the epitrochoids. The length of the anode 25 depends from the structure of the runner 8. The firing anode 24 and the build-up anode 25 are embedded in a common insulating body which electrically insulates the anodes 24, 25 with respect to the peripheral wall 4. The sustaining anode 26 is arranged in the lower portion of the housing 1 and extends over a region where the two epitrochoids are joining each other. The sustaining anode 26 is embedded in an insulating body 29. The operating or working anode 27 extends nearly over the entire remaining epitrochoid and will terminate directly next to the exit or exhaust channel 23. The operating anode 27 is embedded in an insulating body 30.

Figure 3:
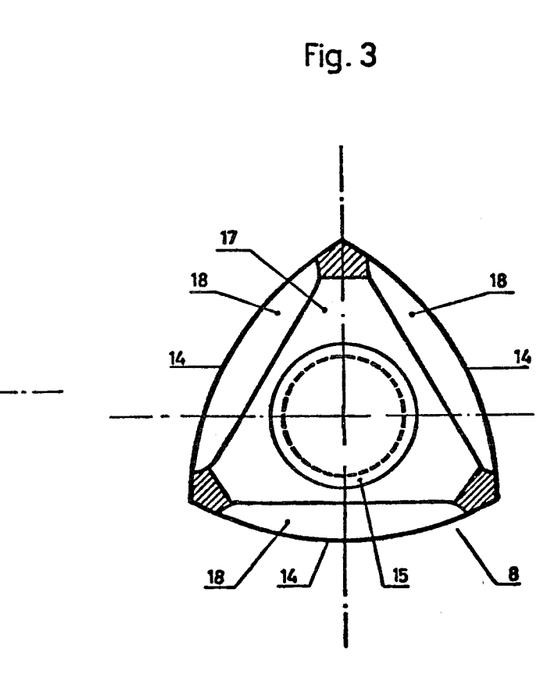
FIG. 3 is a side view of the movable member.
Figure 4:
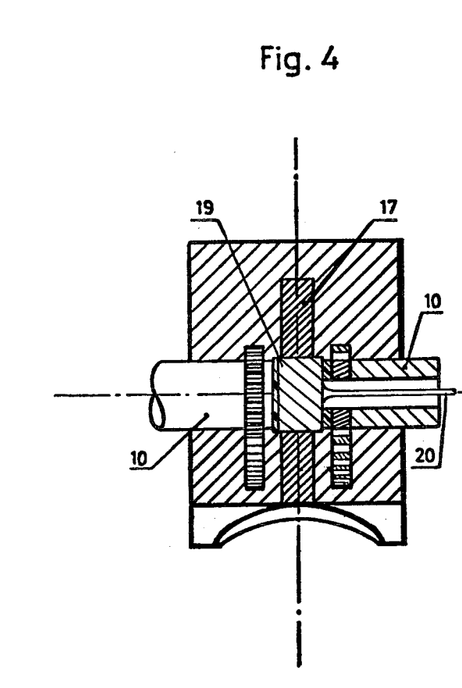
FIG. 4 is a sectional view taken along the line 4—4 in FIG. 1, in which the housing of the machine has been omitted in order to render the showing less crowded.

With reference to FIGS. 3 and 4, it is noted that in the middle portion of the runner 8 there is a member 17 made of an electrically conducting material which in the hereinafter following description will be identified as the cathode. The cathode 17 has the form of a triangle having equal sides, and the arrangement is such that the center of the opening in which the toothed wheel 15 is arranged coincides with the point of intersection of the straight lines bisecting the angles of the triangle. The cathode 17 has a certain thickness. In the operating surface of the runner 8 there is a recess 18 on each side with the upper surfaces of which the cathode 17 is flush. The cathode 17 is also flush with the inner surface of the opening or bore in which the wheel 15 is placed and the cathode 17 is in permanent contact with a slide ring 19 formed on the shaft 10. The slide ring 19 is connected with the negative pole of a voltage source not illustrated here through an electrical conductor 20 passed through the shaft 10 as illustrated.

Figure 5:
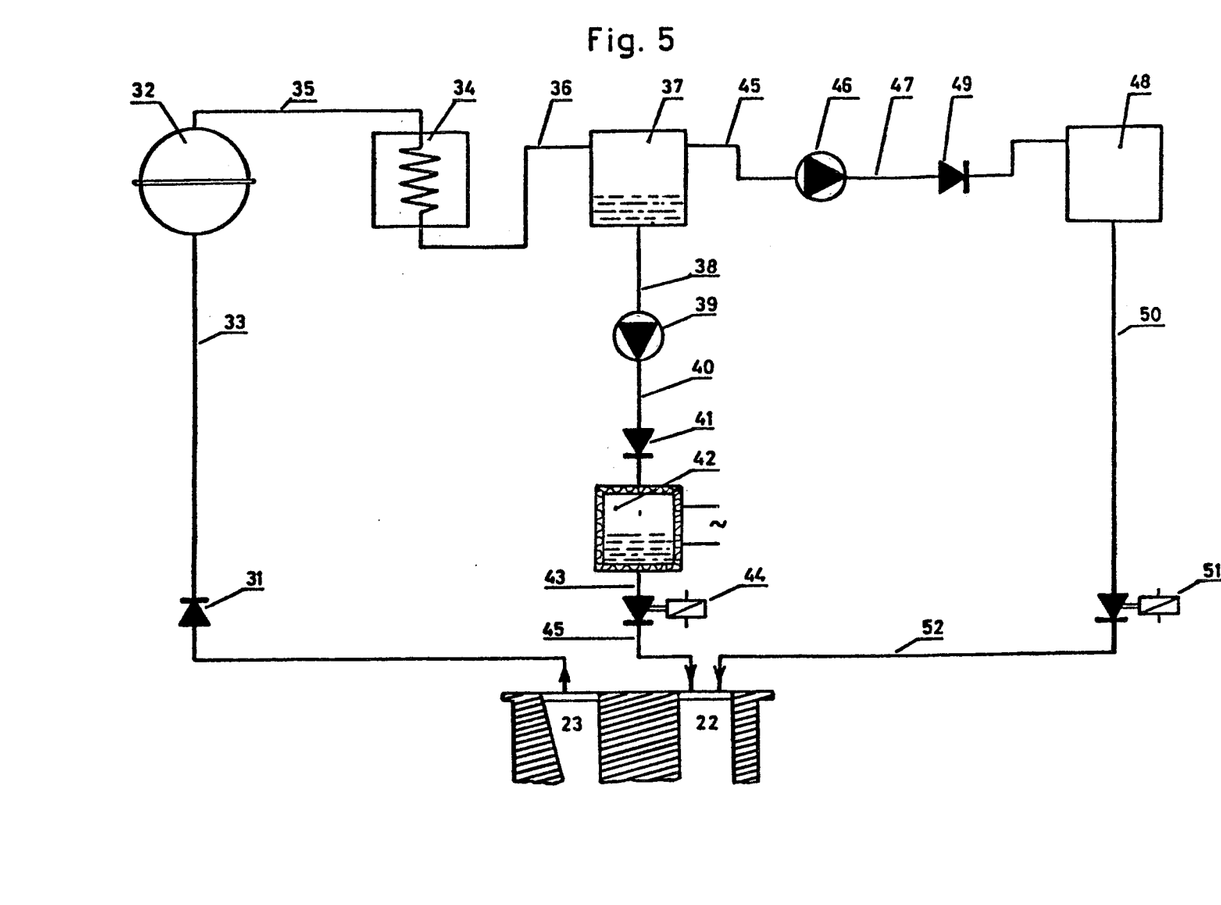
FIG. 5 is a schematic illustration of the embodiment of the closed circuit for the operating medium.

With reference to FIG. 5 illustrating the closed circuit for the operating means, it is noted that the illustrated embodiment will employ mixture of a rare or inert gas and of mercury as the operating medium.

The closed circuit comprises a check valve 31 which is arranged directly near the exit channel 23, an expansion container 32, which is connected through a pipe conduit 33 with the check valve 31. It includes furthermore a condensor 34, which by means of a pipe conduit 35 at one side, is connected with the expansion container 32, and at the other side, over a conduit 36, is connected with a separator 37 which is provided on its lower portion with a pipe conduit 38 connecting it to the suction input of a first pressure increasing pump 39. On the pressure side of the pump 39, a pipe conduit 40 is connected which through a check valve 41 is connected to a preheater 42.

On the preheater 42, a further pipe conduit 43 is connected which communicates with the input side of an injection valve 44. The output side of the injection valve 44, over a pipe conduit 45, is in communication with the input channel 22 of the rotary piston machine. On the top portion of the separator 37, a further pipe conduit 45 will communicate it to the suction side of a second pressuring increasing pump 46. On the high pressure side of the pressure increasing pump 46, there is connected a pipe conduit 47 which communicates with a pressure container 48. After the conduit 47, there is built-in a check valve 49. To the pressure container 48, a further pipe conduit 50 is connected which communicates with the input side of an injection valve 51. The input channel 22 of the rotary piston machine is in communication with the output side of the injection valve 51 by means of a pipe conduit 52.

In the following, the operation of the closed circuit of the illustrated embodiment will be described.

The gas mixture which has been exited from the output channel 23 and which consists of mercury and argon becomes expanded in the expansion container 32 and will be fed into the condenser 34 wherein it will be cooled off. In the condenser 34, the mixture will be cooled to a temperature which lies just about below the evaporating temperature of the mercury. As a result, the mercury remains liquid and will collect itself on the lower part of the separator 37, while the argon gas will remain in the upper portion of the separator 37. The mercury becomes sucked away by means of a pressure increasing pump 39 and will be fed into the preheater 42. The preheater 42 is electrically operated and will keep the temperature of the mercury therein at a temperature which lies just below the evaporating temperature of the mercury, that is, approximately 566° C. The mercury which has been prepared in such a manner, will be injected by means of the injection valve 44, over an electrical control which is not illustrated herein, into the housing 1, and according to the position or cycle of the rotary piston machine, as hereinafter described.

The argon, which has collected itself in the upper portion of the separator 37, becomes sucked away by the pressure increasing pump 46 and fed into a pressurized container 48. During this, the argon will be brought to a pressure which is required for the firing of an electrical discharge arch in the housing of the rotary piston machine. The argon which has been prepared in such a manner is injected through injection valve 51 which is controlled in a manner similar to the injection valve, 44, into the housing 1.

It is noted that the above described circuit can undergo modifications and still produce the necessary physical properties of the injected mixture in the housing in order to bring about the firing of an electric arc.

To this effect, some modifications will be hereinafter described which may be necessary by using other mixture components within the circuit.

Figure 6:
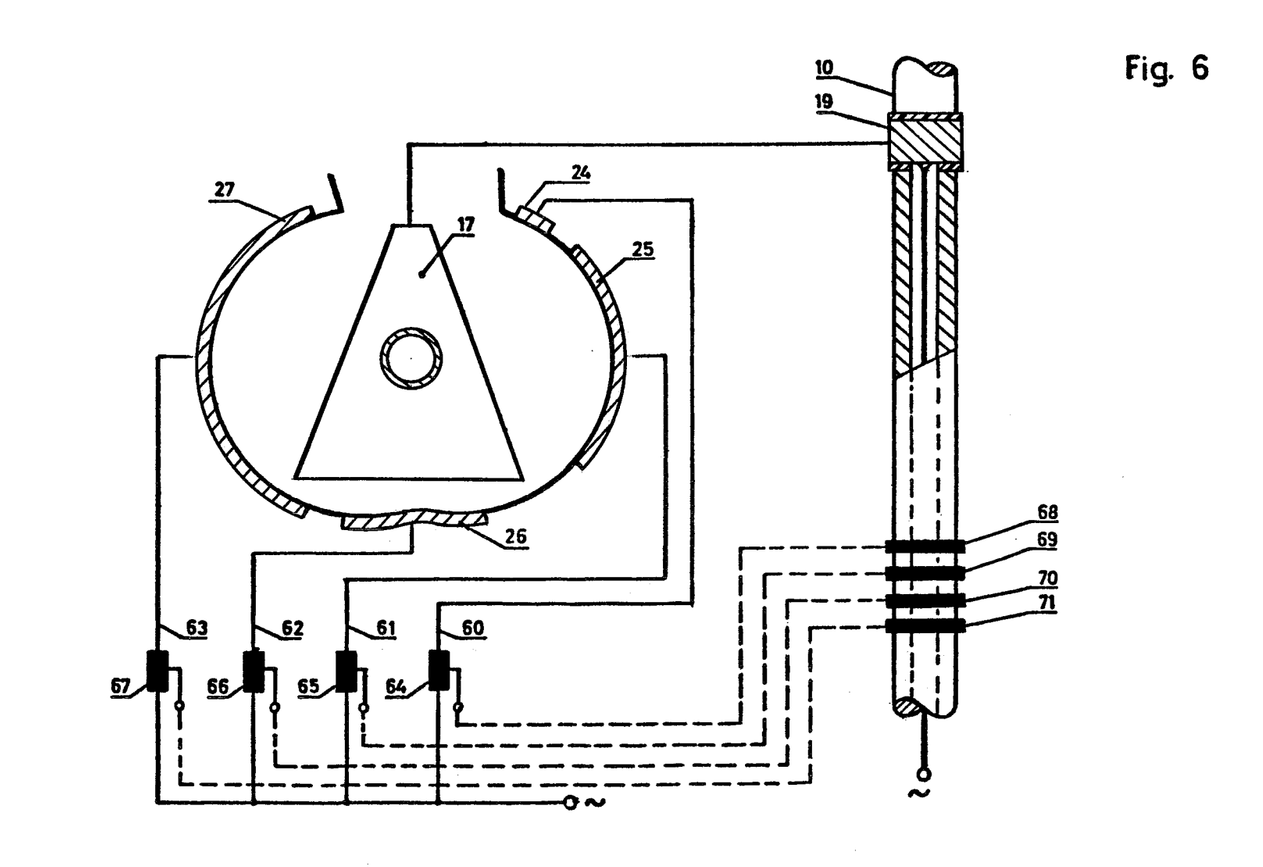
FIG. 6 is a schematic illustration of a control arrangement for regulating the operating currents.

In FIG. 6, there is an embodiment shown for the control arrangement in a schematic fashion. The control arrangement comprises four control circuits 60, 61, 62, and 63, which, over the anodes 24-27 arranged in the housing, are connected to the voltage source mentioned earlier, but not illustrated herein. In each control circuit, there are inductive resistances 64-67 present for limiting the current values. The resistances are adjustable and are controlled by control cams 68-71 arranged on the shaft of the rotary piston machine. A function of the control cams 68-71 will be described in the following in connection with the operation of the machine itself.

In the event the rotary piston machine is operated by an alternating current, then the current regulation is performed with inductors. On the other hand, if the machine is operated by a direct current, then the current regulation will take place in a capacitive manner.

Furthermore, instead of the control cams 68-71, one may use an electronic controlling arrangement.

In the following, the operation of the rotary piston machine will be described with reference to FIGS. 6 and 7a-7g.

The aforementioned rotary piston machine operates on a four cycle principle, that is, the operating medium becomes sucked in or injected, then it becomes compressed, then it is expanded and then it is expelled. For a better understanding of the various cycles, the injected operating medium will be identified by Roman reference numerals.

The rotary piston machine will require a starting aid in the form of a starter in order to bring the machine into rotation. The machine starts to operate in the instant when the runner is in the position illustrated in FIG. 7a. Once the runner 8 will reach this position, the operating medium becomes injected by the injection pump into the housing. At this point, the mercury and the argon are injected separately and simultaneously and in a quantity having a predetermined relationship. By means of the conrolled cams 68-71, the first control circuit is coupled with the firing anode 24 and the voltage is applied which is necessary for the firing. The firing of the injected operating medium I occurs between the firing anode 24 and the cathode 18 at an instant when they are at the relatively smallest distance with respect to each other, that is, when there is the smallest gap between the firing anode 24 and the cathode. The firing anode 24, at this time instant, carries a very high current. The rotating runner 8 will cause a splattering or spraying of the mercury and thereby the spark formation is brought about which is necessary for the commencing of the gas discharge. This process can be compared to the firing process, well-known in connection with high pressure mercury lamps, in which the firing electrode is dipped into the mercury and for the firing it is removed from the mercury bath.

The build-up of the gas discharge will be taken over by the build-up anode 25. In the position illustrated in FIG. 7b, the firing anode is turned off and the build-up anode will be connected by means of the associated control cam 69 with the second control circuit. The control circuit will deliver a voltage which is sufficient to build-up the gas discharge of the operating medium. In this phase, the voltage can be reduced. It is noted that here, in the event the firing effected by the firing anode becomes disrupted, a so-called after firing or after ignition will take place between the build-up anode 25 and the cathode. This can be explained by the fact that the current which energizes the build-up anode 25 is sufficient in order to cause the firing. In the position illustrated in FIG. 7c, the maximum gas expansion for the operating medium I will be reached and then at this point through 22, a certain quantity of new operating medium II becomes injected into the casing.

Figure 7A:
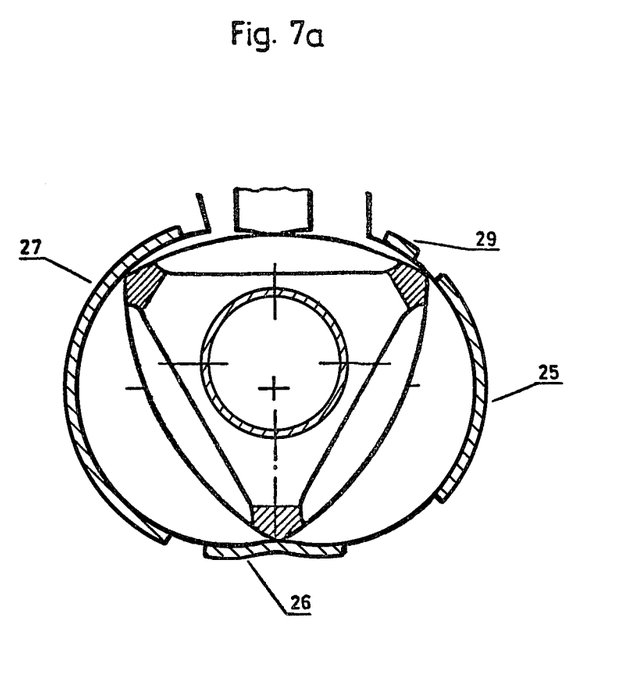
FIGS. 7a –7g are various views illustrating the functional position of the movable member during operation.
Figure 7B:
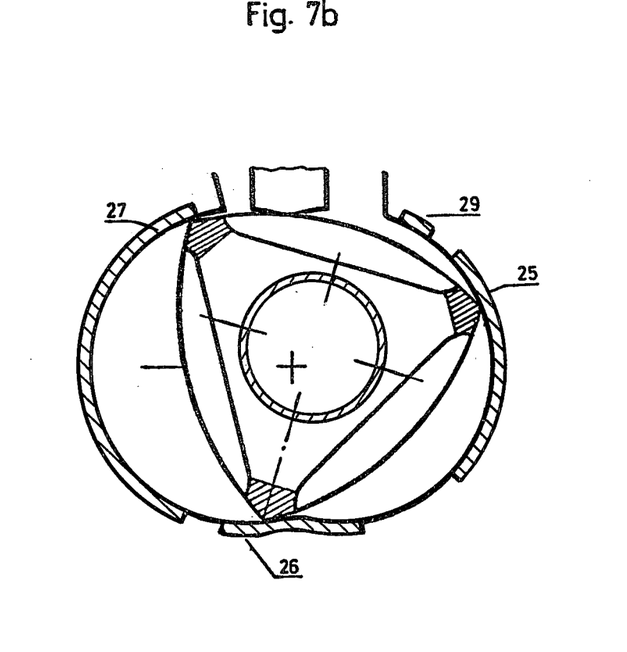
Figure 7C:
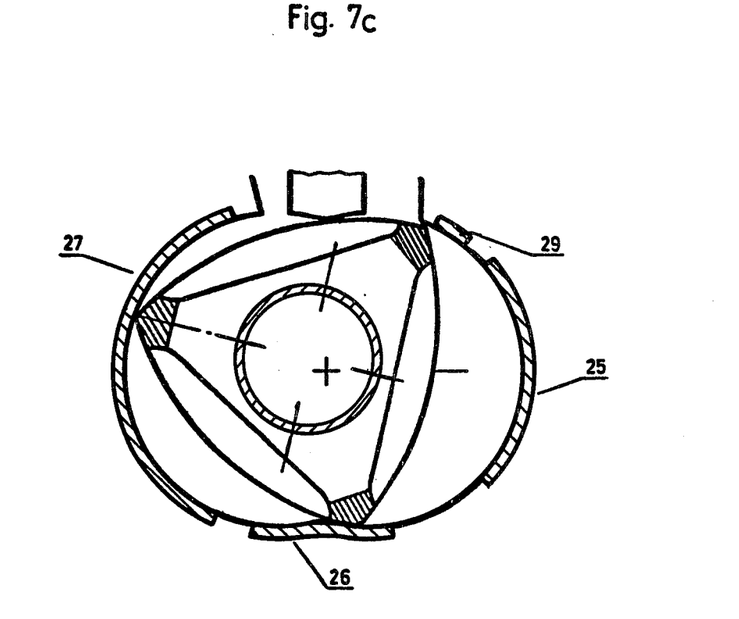
Figure 7D:
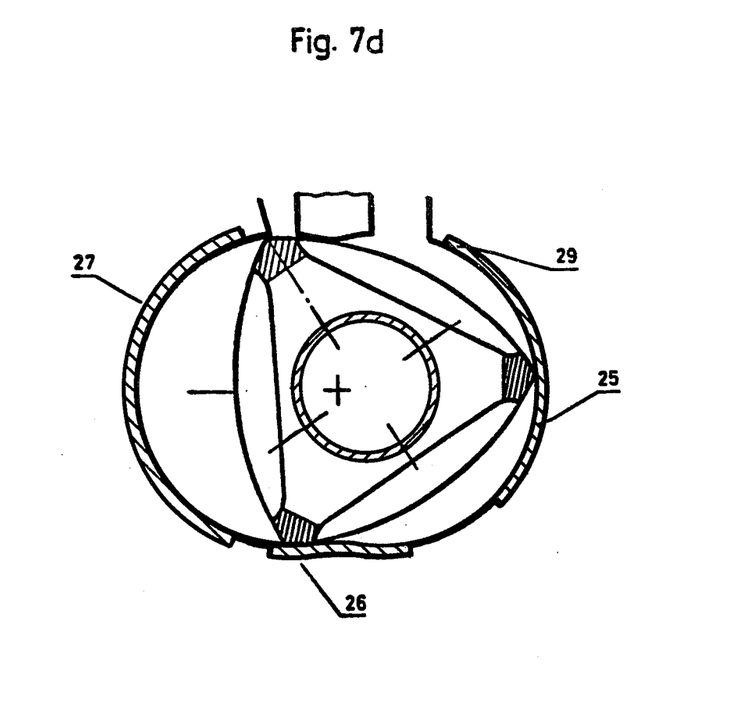

In FIG. 7d position, the compression phase is taken in place of the operating medium I. In this position, the operating medium I is now outside the effect of the build-up anode 26. It begins the build-up of the gas discharge in the operating medium II, which due to the resulting pressure, will aid the translation of the operating medium I into the compression phase. At the beginning of the compression stage, the gas discharge will be sustained by the sustaining anode 26. To this effect, the anode will be supplied through the third control circuit connected now through the respective control cam to a voltage which is sufficient in order to sustain the electron emission. This will take over the operation until the maximum compression pressure has been reached.

Figure 7E:
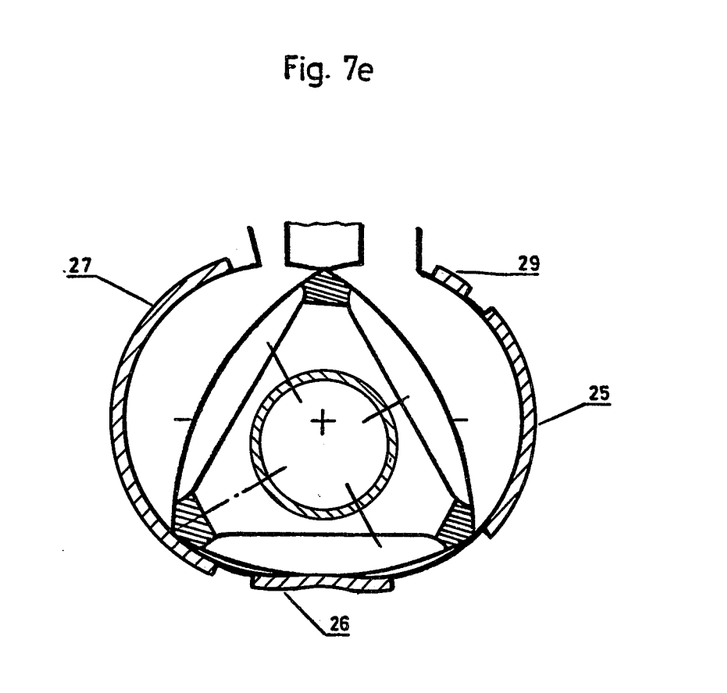

FIG. 7e illustrates a runner position at the instant of the largest compression. In this position between the sustaining anode 26 and the cathode 17 the smallest distance is present. In this position the current-limiting effect for the sustaining anode which has been undertaken by the third control circuit becomes reduced. As a result of the suddenly increasing current flow, a counterpressure (right side in FIG. 7e) results through the firing process in the operating medium II and, due to the low pressure (left side in FIG. 7e) the operating stroke will commence. This is at an instant when the piston 8 has reached a position which will prevent a backfiring, so that a lever effect between the driving shaft 10 and the piston 8 will take place and it will guarantee an operating stroke.

When the operating stroke has commenced, the control cam 71 couples the fourth control circuit in which it is connected with the operating anode. The fourth control circuit will feed the operating anode with a relatively high current. As a result the expansion of the operating medium becomes accelerated.

Figure 7F:
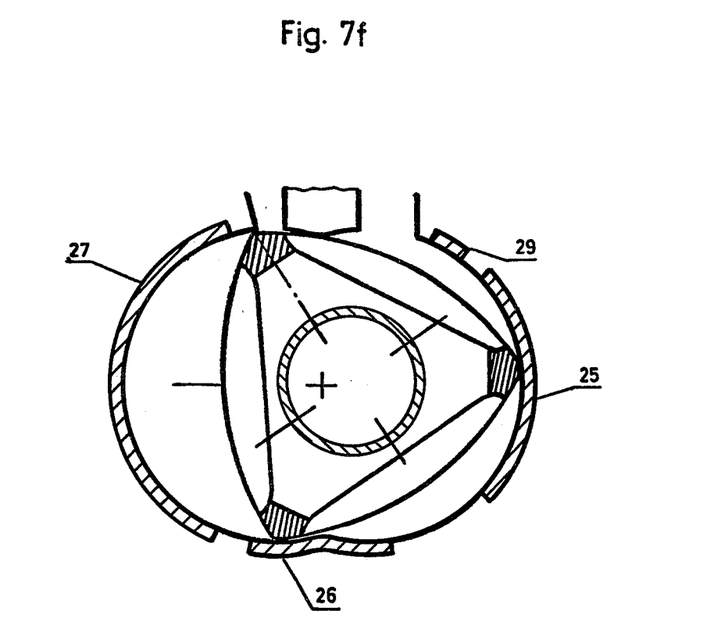

FIG. 7f illustrates the piston 8 in the position at the end of the operating stroke. Throughout the entire operating stroke the gas discharge of the operating medium I will be sustained through the operating anode. Simultaneously in this position the compression phase will take place for the operating medium II and the build-up of the gas discharge in the operating medium III.

Figure 7G:
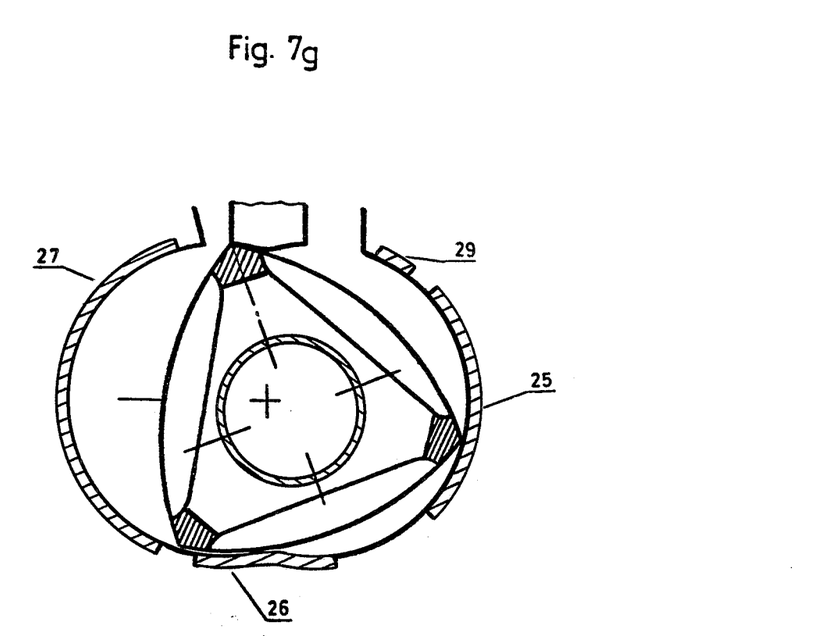

In the position illustrated in FIG. 7g the operating medium I becomes expelled from the rotary piston machine and will be fed back into the closed circuit. In this position the operating cycle of the operating medium I has been completed.

I wish it to be understood that I do not desire to be limited to the exact details of construction shown and described, for obvious modifications will occur to a person skilled in the art.

Having thus described the invention, what I claim as new and desire to be secured by Letters Patent, is as follows:

1. A machine operable according to the gas discharge principle, comprising a fixed housing including a shaft, said housing having side walls and a casing surrounding peripherally said side walls, a rotary member secured for rotation on said shaft in said housing in an eccentric fashion, said rotary member comprising a plurality of projections, said projections during the rotation being in continuous sliding contact with the inner surface of said casing and sliding along said inner surface during rotation, said rotary member during rotation forming a plurality of operating chambers having each a variable volume, further including a guide means fixed on said rotary member and a mating guide means fixed on said shaft for guiding said rotary member, a plurality of electrically conducting means provided in said casing of said housing, an electrically conducting means provided in said rotary member, said electrically conducting means in said casing and said electrically conducting means in said rotary member being arranged lying opposite with respect to each other when said rotary member is mounted in said housing for rotation, said electrically conducting means in said casing and said rotary member having a predetermined distance with respect to each other in predetermined rotary positions of said rotary member, a source of voltage and means connecting each of said electrically conducting means of said casing and of said rotary member to said voltage source for creating an electrical field between respective electrically conducting means in said casing and in said rotary member at a predetermined sequence, and a closed circuit coupled to said housing for supplying thereto an operating medium in a predetermined quantity and at predetermined instant.

2. The machine as claimed in claim 1, wherein said guide means comprises an inner toothed wheel and said mating guide means comprises an outer toothed wheel.

3. The machine as claimed in claim 1, wherein said operating medium comprises a mixture consisting of an ionizable gas and an evaporable electrically conducting substance.

4. The machine as claimed in claim 1, wherein there are provided four electrically conducting means in said casing of said housing and said electrically conducting means in said casing are arranged insulated electrically from said housing and embedded flush with the inner surface of said casing.

5. The machine as claimed in claim 1, wherein said machine comprises further an input means for said operating medium and an output means for said operating medium after the operating cycle has been performed, and wherein said electrically conducting means in said casing are arranged in a sequence, a first electrically conducting means being arranged directly at said input means, second electrically conducting means being arranged directly adjacent and following said first electrically conducting means, said third electrically conducting means being arranged at a predetermined distance from said second electrically conducting means and said fourth electrically conducting means being arranged directly adjacent and following said third electrically conducting means.

6. The machine as claimed in claim 1, wherein said plurality of projections of said rotary member comprise three projections, said electrically conducting means in said rotary member being electrically insulated from said rotary member and arranged flush with the surface of said rotary member between adjacent projections.

7. The machine as claimed in claim 6, wherein said projections each carry a sealing means for providing a pressure type sealing of the respective operating chambers during rotation when sliding over said inner surface of said casing.

8. The machine as claimed in claim 1, comprising control means coupled between said voltage source and said electrically conductive means.

9. The machine as claimed in claim 8, wherein said control means comprises a plurality of control circuits, each of said control circuits comprises a positioning device operable to independently set the associated control circuit to a various and predetermined voltage level.

10. The machine as claimed in claim 9, wherein four control circuit means are provided and wherein the first of said control circuit is coupled to said first electrically conducting means and is set to respond at a voltage level sufficient to ignite said operating medium, said second control circuits being coupled to said second electrically conducting means and is set to a voltage level sufficient to build up the gas discharge in the operating medium, a third electrical circuit coupled to said third electrically conducting means and set to a voltage level sufficient to sustain the gas discharge and also sufficient to accelerate the gas discharge, and a fourth electrical circuit coupled to said fourth electrically conducting means and therein set to a voltage level sufficient to intensify the gas discharge.

11. The machine as claimed in claim 1, wherein said operating medium comprises mercury as a first component and argon as a second component and wherein said closed circuit means comprises a separating device for separating the operating medium exited from said casing into said first and second components, a branch circuit including a heating device for preheating said first component and a second branch circuit comprising a compressing device for compressing said second component and being coupled to said input means for said housing for feeding said compressed second component into said housing.

* * * * *